US009638107B2

United States Patent
Abousleiman et al.

(10) Patent No.: US 9,638,107 B2
(45) Date of Patent: May 2, 2017

(54) GAS TURBINE ACCESSORY GEARBOX INCORPORATING DECOUPLING MEANS

(75) Inventors: Vincent Abousleiman, Colombes (FR); Romaric Fritz, La Garenne Colombes (FR)

(73) Assignee: HISPANO SUIZA, Colombes (FR)

( * ) Notice: Subject to any disclaimer, the term of this patent is extended or adjusted under 35 U.S.C. 154(b) by 629 days.

(21) Appl. No.: 14/130,804

(22) PCT Filed: Jul. 2, 2012

(86) PCT No.: PCT/FR2012/051520
§ 371 (c)(1),
(2), (4) Date: Jan. 3, 2014

(87) PCT Pub. No.: WO2013/004958
PCT Pub. Date: Jan. 10, 2013

(65) Prior Publication Data
US 2014/0127000 A1    May 8, 2014

(30) Foreign Application Priority Data

Jul. 4, 2011 (FR) .................................... 11 56023

(51) Int. Cl.
*F16D 11/04* (2006.01)
*F02C 7/36* (2006.01)
(Continued)

(52) U.S. Cl.
CPC .................. *F02C 7/36* (2013.01); *F02C 7/32* (2013.01); *F16D 11/04* (2013.01); *F16D 28/00* (2013.01);
(Continued)

(58) Field of Classification Search
CPC ...... F02C 7/32; F02C 7/36; F05D 2260/4031; F16D 2001/103; F16D 11/04; F16D 2023/126; F16D 28/00
See application file for complete search history.

(56) References Cited

U.S. PATENT DOCUMENTS

| 4,077,202 A | 3/1978 | Schutze |
| 4,734,590 A * | 3/1988 | Fluegel .................. F16H 47/04 290/1 C |

(Continued)

FOREIGN PATENT DOCUMENTS

| EP | 0 200 178 | 11/1986 |
| EP | 2 199 573 | 6/2010 |
| FR | 2 309 731 | 11/1976 |

OTHER PUBLICATIONS

International Search Report Issued Sep. 5, 2012 in PCT/FR12/051520 Filed Jul. 2, 2012.

*Primary Examiner* — Ninh H Nguyen
(74) *Attorney, Agent, or Firm* — Oblon, McClelland, Maier & Neustadt, L.L.P.

(57) ABSTRACT

A gas turbine AGB has a front lateral face, a rear lateral face opposite from the front lateral face, and a peripheral rim closing the box. At least one gear train is mounted in the AGB and is made up of a plurality of gearwheels meshing together, and designed to be coupled to a drive shaft for driving an accessory. The AGB further comprises, mounted between a central shaft carrying each gearwheel and the drive shaft, a decoupling unit for decoupling the accessory and constituted by a dog clutch having axial teeth cooperating with complementary teeth of the central shaft. The dog clutch includes internal fluting engaged with the corresponding external fluting of the drive shaft. The decoupling unit is controlled by an electric actuator acting on the
(Continued)

movement of a plunger pin having one end co-operating with an outer helical groove in the dog clutch.

<center>5 Claims, 3 Drawing Sheets</center>

(51) Int. Cl.
    *F16D 28/00*     (2006.01)
    *F02C 7/32*     (2006.01)
    *F16D 23/12*     (2006.01)
    *F16D 1/10*     (2006.01)

(52) U.S. Cl.
    CPC .. *F05D 2260/33* (2013.01); *F05D 2260/4023* (2013.01); *F05D 2260/4031* (2013.01); *F16D 2001/103* (2013.01); *F16D 2023/126* (2013.01); *Y02T 50/671* (2013.01)

(56) References Cited

<center>U.S. PATENT DOCUMENTS</center>

| | | | | |
|---|---|---|---|---|
| 4,989,707 | A * | 2/1991 | Doty | F16D 11/04 |
| | | | | 192/69.2 |
| 5,103,949 | A * | 4/1992 | Vanderzyden | F16D 9/02 |
| | | | | 192/101 |
| 5,174,109 | A | 12/1992 | Lampe | |
| 6,938,746 | B2 * | 9/2005 | Skorucak | F16D 27/118 |
| | | | | 192/101 |
| 7,144,349 | B2 * | 12/2006 | Mitrovic | B64D 35/00 |
| | | | | 475/331 |
| 8,074,777 | B2 * | 12/2011 | Birdi | F16D 11/04 |
| | | | | 192/101 |
| 2004/0065091 | A1 | 4/2004 | Anderson | |
| 2010/0156113 | A1 | 6/2010 | Lemmers | |

\* cited by examiner

GAS TURBINE ACCESSORY GEARBOX INCORPORATING DECOUPLING MEANS

BACKGROUND OF THE INVENTION

The present invention relates to the general field of gas turbines, and more particularly it relates to a gearbox for driving accessories of a gas turbine.

The field of application of the invention is that of gas turbines for airplane or helicopter engines, and also for auxiliary power units (APUs).

In general, an airplane or helicopter gas turbine engine includes a gearbox for driving a plurality of accessories of the turbine or for driving auxiliary equipment, such as in particular various pumps for producing hydraulic energy, for feeding fuel, for lubrication, electricity generators for producing electrical power, e.g. of the integrated drive generator (IDG) and of the variable frequency generator (VFG) type, etc. Such an accessory gearbox is commonly referred to by the abbreviation AGB.

In known manner, an AGB contains one or more gear trains, each made up of a plurality of gearwheels that are driven in rotation by a power transmission shaft, which shaft is coupled to a shaft of the turbine. Each accessory is generally mounted against one of the lateral faces of the gearbox and includes a drive shaft that couples with one of the gearwheels of the gear train(s). In addition to this accessory support function, these lateral faces also perform a bearing support function, a sealing function, or indeed a lubrication function. While the turbine is in operation, a fraction of the mechanical power it generates is taken from the turbine shaft and is transmitted via the power transmission shaft and the gear trains to the drive shafts of the various accessories mounted on the AGB in order to drive them.

The size of AGBs varies in particular as a function of the number and of the kinds of accessories it is to drive, which accessories also give rise to considerable overhangs.

When designing an AGB, it is therefore important to reduce as much as possible the overall size and weight of the AGB. In application FR 09/50617, this reduction is made possible by acting on the positioning of the accessories relative to one another as a function of their individual sizes. Nevertheless, there still exists a need to further reduce this size and generally to increase the reliability of such an AGB.

OBJECT AND SUMMARY OF THE INVENTION

An essential object of the present invention is thus to provide a gas turbine AGB that makes it possible to reduce its size considerably while also significantly increasing its reliability.

This object is achieved by a gas turbine AGB having a front lateral face and a rear lateral face opposite from the front lateral face and having a peripheral rim closing the box, and in which there is mounted at least one gear train made up of a plurality of gearwheels meshing together, each gearwheel being carried by a central shaft held at each of its two ends by a respective rolling bearing and designed to be coupled to a drive shaft for driving an accessory, the AGB being characterized in that it further comprises, mounted between said central shaft and said drive shaft, decoupling means for decoupling said accessory and constituted by a dog clutch having axial teeth co-operating with complementary teeth of said central shaft, said dog clutch including internal fluting engaged with the corresponding external fluting of said drive shaft, and in that said decoupling means are controlled by an electric actuator acting on the movement of a plunger pin having one end co-operating with an outer helical groove in said dog clutch.

By integrating the function of decoupling the accessories in the AGB, the accessories are reduced in length and in suspended weight, thus reducing their overhangs, thereby reducing the overall size of the assembly comprising the AGB and the accessories, and also increasing the reliability of the decoupling function.

Said accessory is preferably an IDG or a VFG.

Advantageously, said drive shaft is supported in said central shaft by two bearings, and a return spring is provided, preferably a leaf spring, bearing firstly against an internal groove of said dog clutch and secondly against an external lateral rim of said drive shaft in order to hold the dog clutch in the coupling position so long as said plunger pin is withdrawn from said outer helical groove.

Preferably, said plunger pin may have an end extending outside the AGB in order to enable coupling and/or decoupling of said accessory to be controlled manually.

Advantageously, said electric actuator is controlled by the pilot or from a control module.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF THE INVENTION

Figure 2:
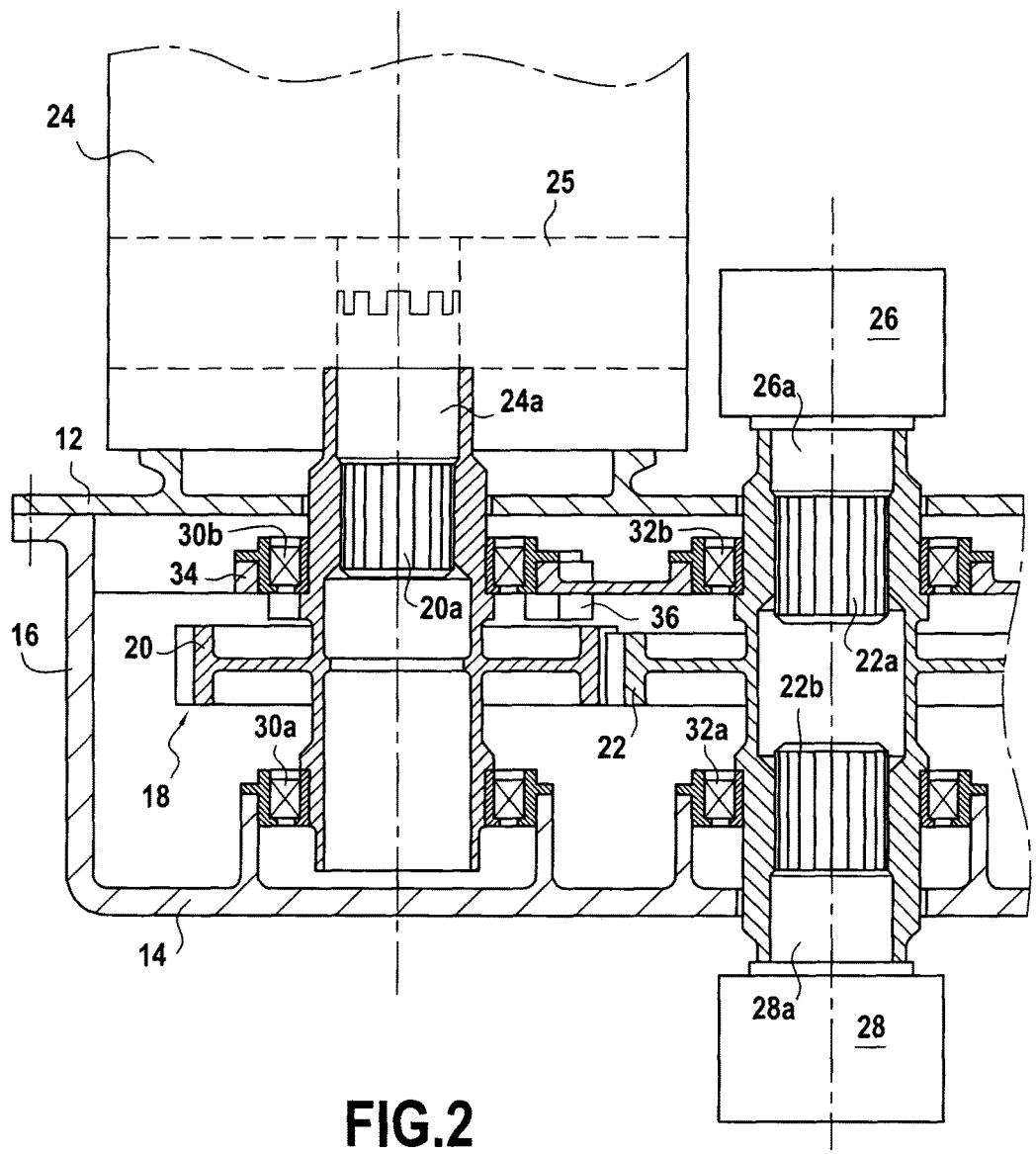
FIG. 2 is a fragmentary section view of a prior art accessory gearbox.

FIG. 2 is a fragmentary section view of an example of a conventional accessory gearbox 10 for a gas turbine of an airplane engine. Naturally, the invention applies equally well to helicopter engine gas turbines, and to APUs.

This AGB is conventionally a substantially rectangular box of "banana" or "haricot bean" shape, with a front lateral face 12 and a rear lateral face 14 opposite from the front face and having a raised peripheral rim 16 closing the box, the box containing one or more gear trains 18 that extend parallel to the two lateral faces. A power transmission shaft (not shown in figures) takes mechanical power from a shaft of the turbine (also not shown) for transmission to the gear train 18 represented by its first two gearwheels 20 and 22.

The gear train as described in this way serves to drive rotation of a set of distinct accessories 24, 26, 28 of the turbine that emerge from the lateral faces 12 and 14 of the box, substantially perpendicularly thereto.

These accessories may be constituted by electricity generators for delivering electrical power, one example of which is a VFG 24 incorporating its decoupling means 25; hydraulic pumps 26 to 28 for delivering oil under pressure to the engine and/or to its equipment, or lubricating oil to the oil circuits of the engine and/or to its equipment; a fuel pump; a permanent magnet alternator for delivering electricity to equipment of the engine; a starter for starting the engine; a centrifugal deoiler; etc. Each accessory has a drive shaft 24a to 28a that is mounted on a gearwheel of the gear train in order to be driven in rotation; and more particularly a fluted end of the drive shaft is inserted in torque-transmission fluting 20a; 22a, 22b of the central shaft supporting the gearwheel 20, 22. Each central shaft is held at each of its two ends by a respective rolling bearing 30a, 30b; 32a, 32b. As shown, two accessories 26, 28 mounted against different lateral faces of the box may have their drive shafts coupled in rotation with a shared gearwheel 22. It may also be observed that the rolling bearings 30b, 32b at one of the ends are mounted on a bearing support 34 that is distinct from the front lateral face 14 and that is attached to the peripheral rim 16 by fastener means 36.

In general, the accessories 24 to 28 have different speeds of rotation (with the exception in this example of the hydraulic pumps 26 and 28 that have the same speed of rotation since they are mounted on the same gearwheel 22) and different volumes, thereby giving rise to overhangs that are likewise different. However, these overhangs give rise to an unbalanced distribution of the weights that are supported by the AGB.

Figure 1A:
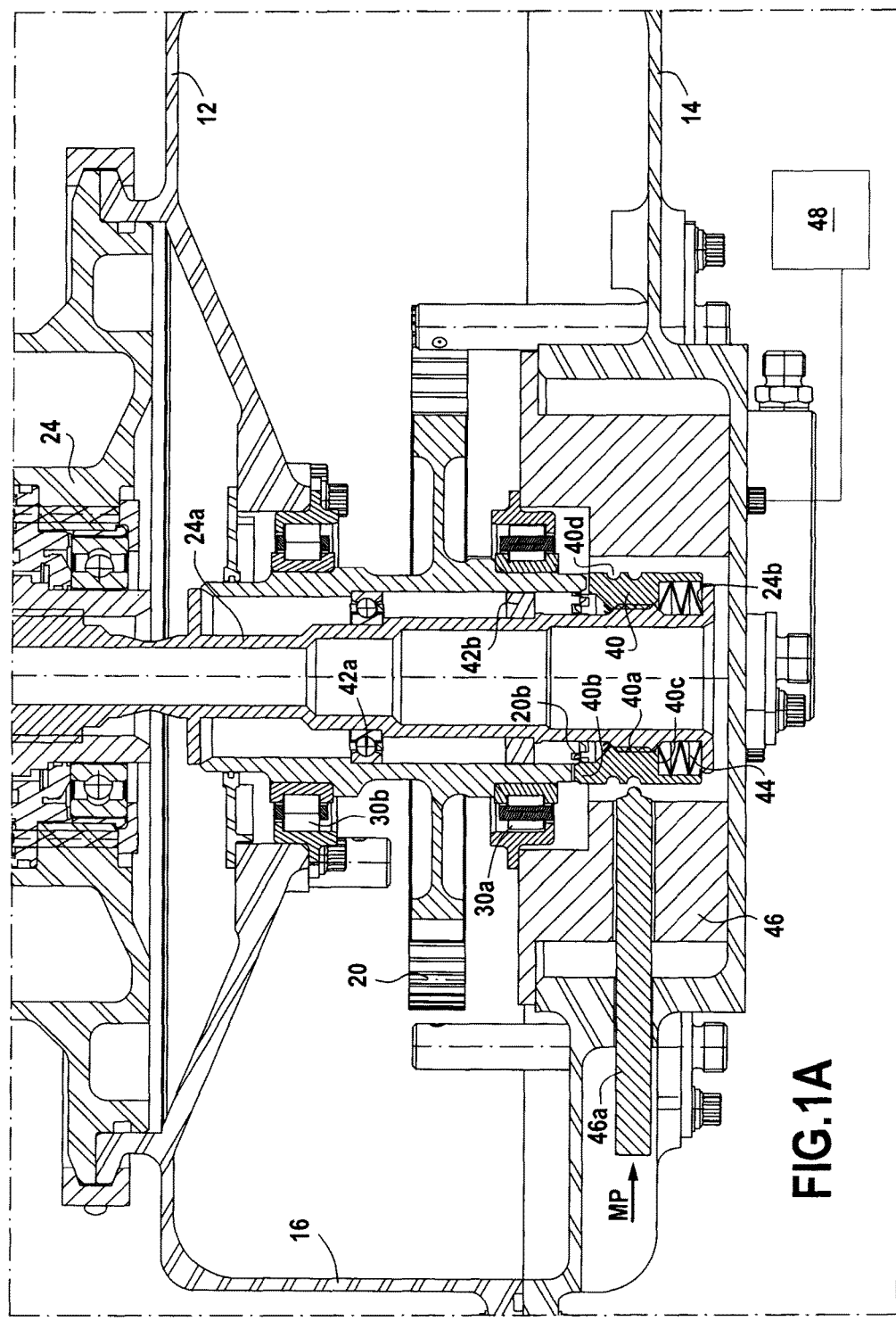
FIGS. 1A and 1B show the integration of a VFG decoupling device in an AGB of the invention.
Figure 1B:
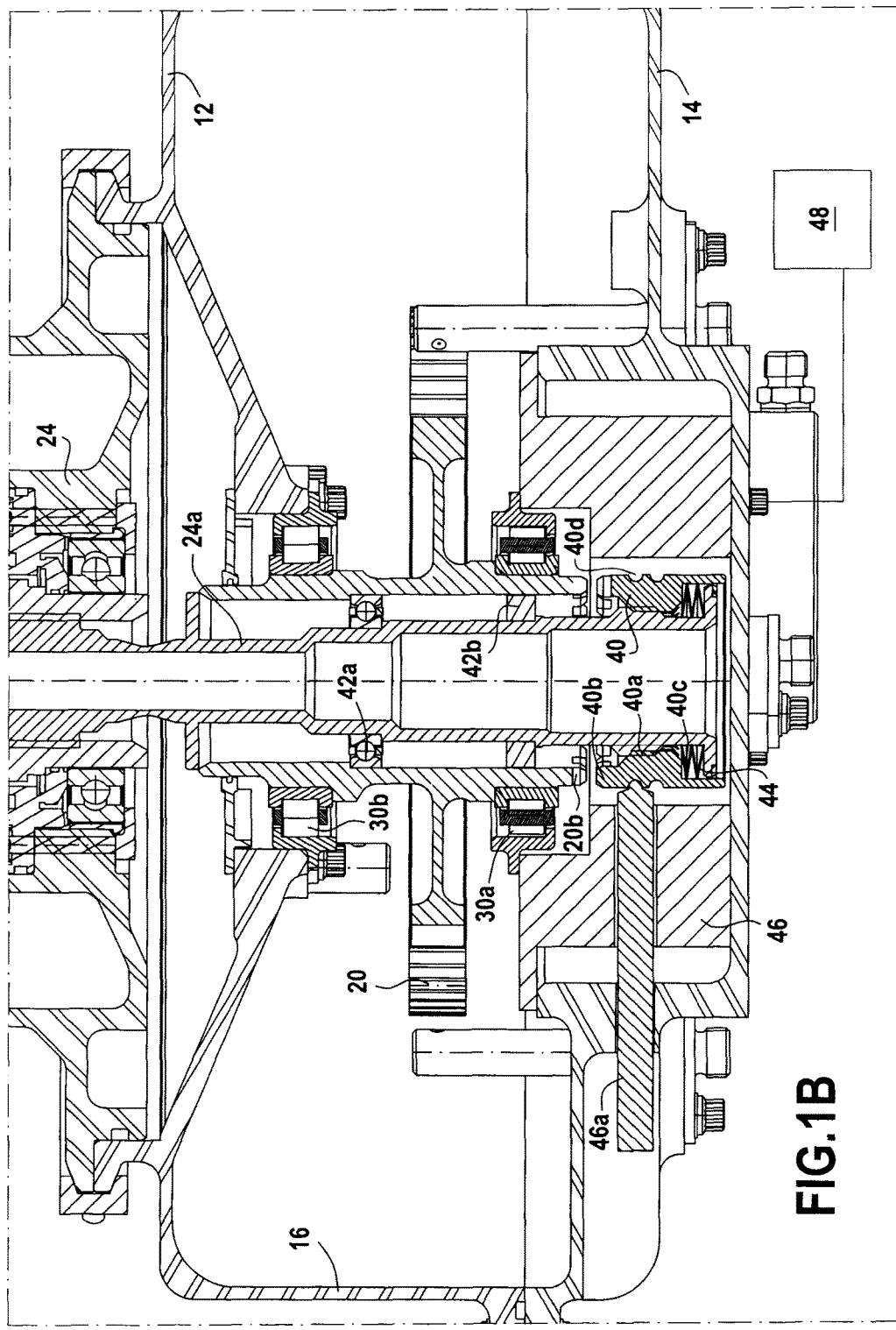

In the invention, and as shown in FIGS. 1A and 1B, it is proposed to reduce the overhang of an accessory, e.g. of the VFG 24, by incorporating the means 25 for decoupling the accessory directly in the AGB, which means usually form an integral portion of the accessory. To do this, the drive shaft 24a of the generator 24 is no longer directly engaged via its external fluting with the internal fluting 20a of the central shaft of the gearwheel 20, but rather with the internal fluting 40a of a dog clutch 40 having axial teeth 40b co-operating with complementary teeth 20b of the central shaft of the gearwheel 20. The drive shaft 24a is supported in the central shaft of the gearwheel 20 by two smooth or rolling bearings 42a, 42b. A return spring 44, e.g. a leaf spring, is provided bearing firstly against an internal groove 40c of the dog clutch and secondly against the outer lateral rim 24b of the drive shaft in order to hold the dog clutch automatically in the coupling position.

The dog clutch 40 is moved by means of an electric actuator 46 moving a plunger pin 46a having one end co-operating with a helical outer groove 40d in the dog clutch 40 (with the opposite, other end of the pin preferably extending outside the box). The actuator is controlled directly by the pilot or else from a control module 48, e.g. the generator control unit (GCU). Moreover, as in the example shown, the actuator may also support the rolling bearing 30a.

The operation of the AGB of the invention is no different from that of a conventional AGB so long as the dog clutch 40 is engaged (FIG. 1A), the accessories, and in particular the VFG 24, then being driven in rotation by the gear train 18 of the AGB from the shaft of the engine turbine via the power transmission shaft in conventional manner. It should merely be observed that by shortening the length (overhang) and the suspended weight of the accessory, the weight that needs to be supported by the various transmission members of the AGB is reduced. It is only when it is desired to decouple an accessory that its operation is different. Specifically, in this configuration (FIG. 1B), decoupling does not take place in the accessory itself, but directly in the AGB, with the GCU or the pilot (during an automatic control process) then acting on the actuator 46 to move the plunger pin 46a into the helical groove in the dog clutch 40, thereby causing the dog clutch to move far enough in translation to lose contact between its axial teeth and the teeth on the central shaft of the gearwheel 20. Since the drive shaft 24a is no longer driven by the gearwheel, operation of the accessory will naturally be interrupted. It should be observed that this decoupling does not require the operation of the accessory to be stopped, and may be performed while it is running. In order to put the accessory it back into operation, it suffices to withdraw the plunger pin 46a from the helical groove in the dog clutch by controlling the actuator 46, with this withdrawal under drive from the return spring 44 then pushing the dog clutch towards the central shaft and thus enabling their respective teeth to engage.

It should be observed that since the plunger pin 46a has one end extending outside the AGB, it is possible to control decoupling or coupling of the accessory manually, merely by pushing or pulling on this end (arrow MP).

Thus, taking the accessory-decoupling function away from the accessory, limits the impact on decoupling of any damage to the accessory (e.g. breakage of the bearing driving an eccentric load), so the robustness and the reliability of decoupling are consequently improved. Thereafter, by placing the decoupling, which is mainly mechanical, in the likewise mechanical drivetrain that operates at a moderate temperature, the decoupling is spaced apart from the sometimes-high operating temperature of the accessory. Finally, in the event of a failure of the decoupling, maintenance is made easier, since it suffices to remove the lateral face of the AGB on which it is installed in order to withdraw it, instead of it being necessary to change the entire accessory, as in the prior art.

It should be observed that although the above description refers to an accessory of the VFG type (reference could also be made to an accessory of the IDG type), it is clear that such an invention may be applied to any accessory that is a line replaceable unit (LRU), without requiring any modification to the accessory.

The invention claimed is:
1. A gas turbine accessory gear box (AGB), comprising:
a front lateral face;
a rear lateral face opposite from the front lateral face;
a peripheral rim extending between the front and rear lateral faces;
a gear train including a plurality of gearwheels meshing together, one of the gearwheels being carried by a central shaft held at each end thereof by a respective rolling bearing, the central shaft being coupled to a drive shaft for driving an accessory; and
decoupling means, mounted between said central shaft and said drive shaft, for decoupling said accessory and including a dog clutch having axial teeth at a first end of the dog clutch co-operating with complementary teeth at a free end of said central shaft, said dog clutch including internal fluting engaged with the corresponding external fluting of said drive shaft,
wherein said decoupling means are controlled by an electric actuator acting on the movement of a plunger pin having one end co-operating with an outer helical groove in an exterior surface of said dog clutch,
wherein in a first coupling position, the plunger pin is free of contact with the outer helical groove and the axial teeth of the dog clutch are engaged with the complementary teeth of the central shaft, and in a second decoupling position, the plunger pin is in contact with the outer helical groove and the axial teeth of the dog clutch are disengaged from the complementary teeth of the central shaft,
wherein the drive shaft is disposed within the central shaft, the drive shaft being supported in the central shaft by a bearing, and
wherein a return spring is provided in an internal groove of the dog clutch, a first end of the return spring abutting against a radial shoulder of the internal groove and a second end of the return spring abutting against an external lateral rim of the drive shaft, and the return spring holding the dog clutch in the first coupling position when the plunger pin is free of contact with the outer helical groove.

2. The AGB according to claim 1, wherein said accessory is an integrated drive generator (IDG) or a variable frequency generator (VFG).

3. The AGB according to claim 1, wherein said return spring is a leaf spring.

4. The AGB according to claim 1, wherein said plunger pin has an end extending outside the AGB in order to enable at least one of coupling and decoupling of said accessory to be controlled manually.

5. The AGB according to claim 1, wherein said electric actuator is controlled manually or automatically.

* * * * *